Dec. 5, 1939.         G. BITZER         2,182,220
UNIVERSAL MOVEMENT CONTROL FOR POINT MECHANISM OF FLAT KNITTING MACHINES
Filed May 21, 1938      10 Sheets-Sheet 1
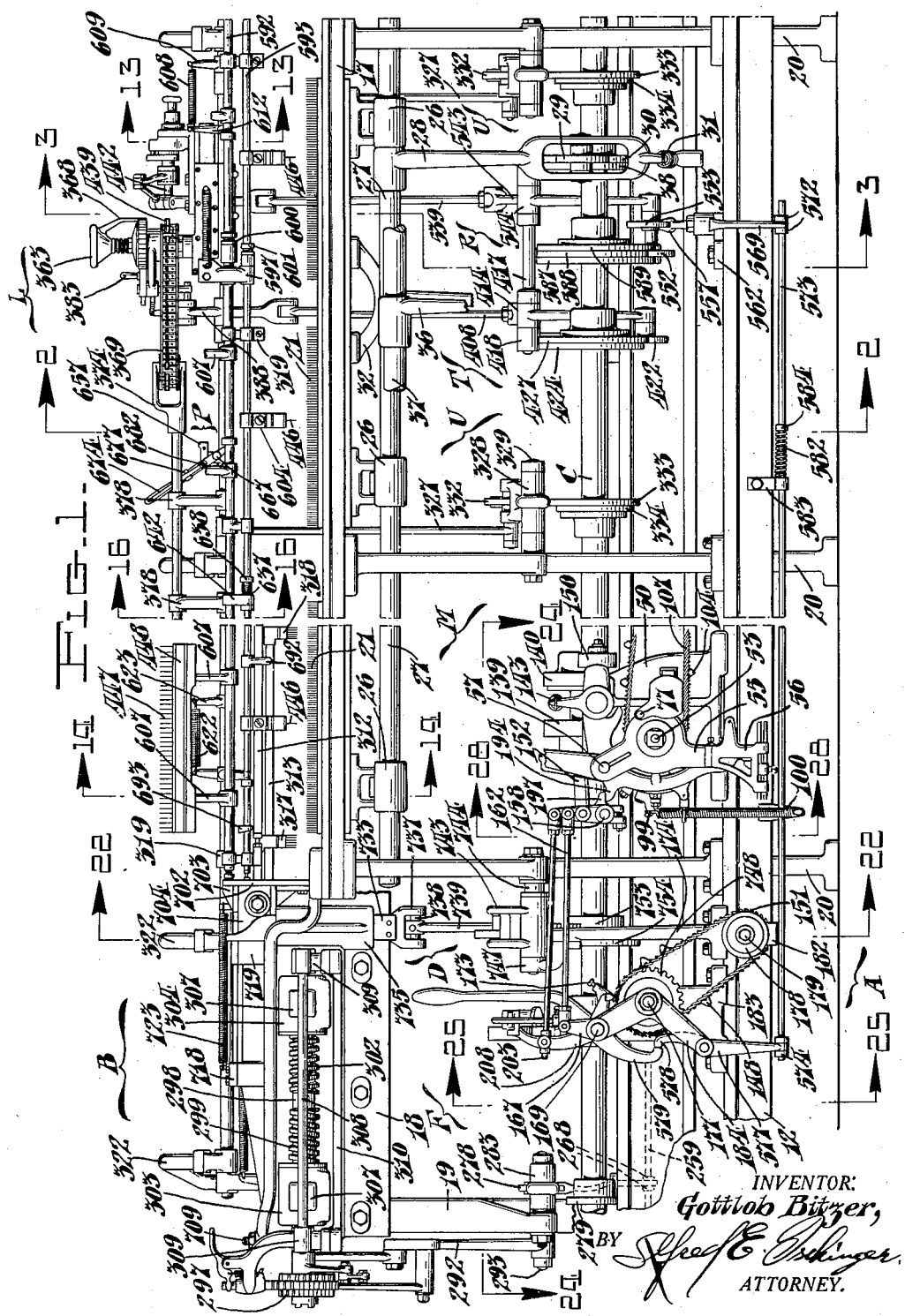
INVENTOR:
Gottlob Bitzer,
BY
ATTORNEY.

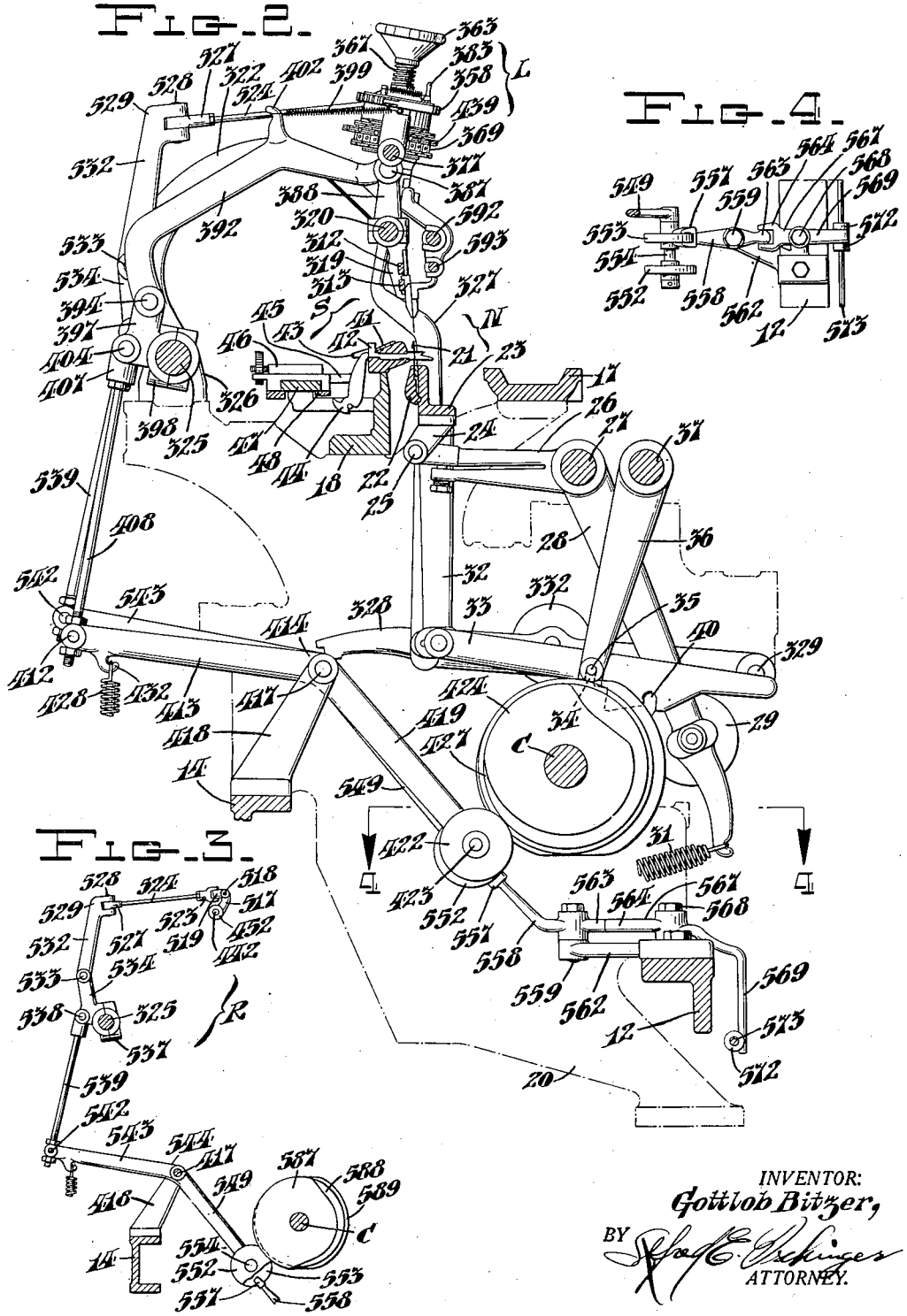

Dec. 5, 1939.   G. BITZER   2,182,220
UNIVERSAL MOVEMENT CONTROL FOR POINT MECHANISM OF FLAT KNITTING MACHINES
Filed May 21, 1938   10 Sheets-Sheet 3
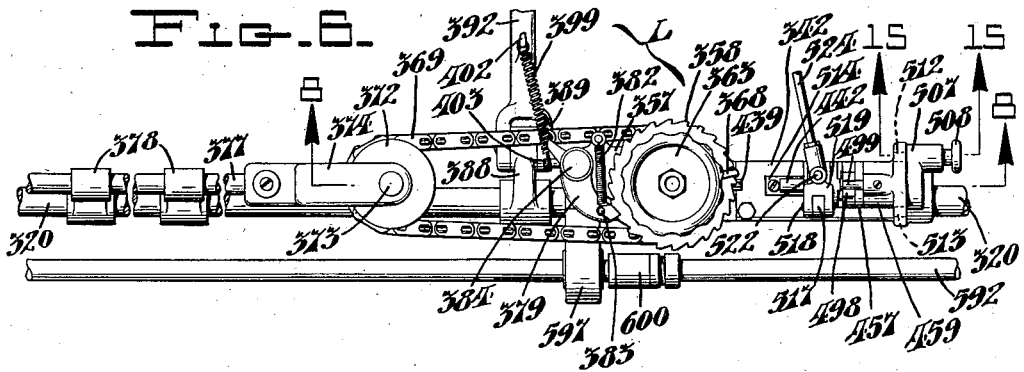
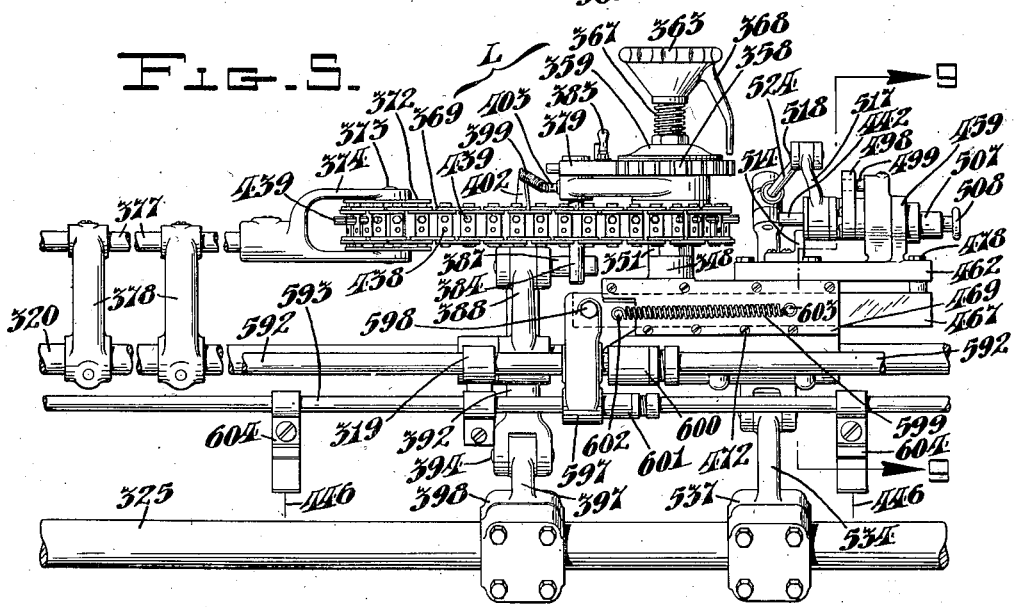
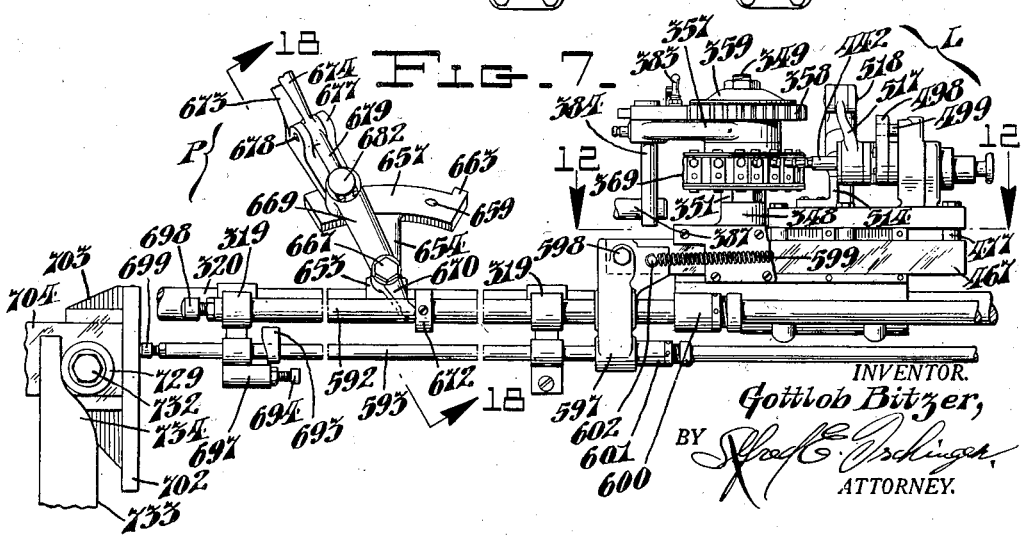

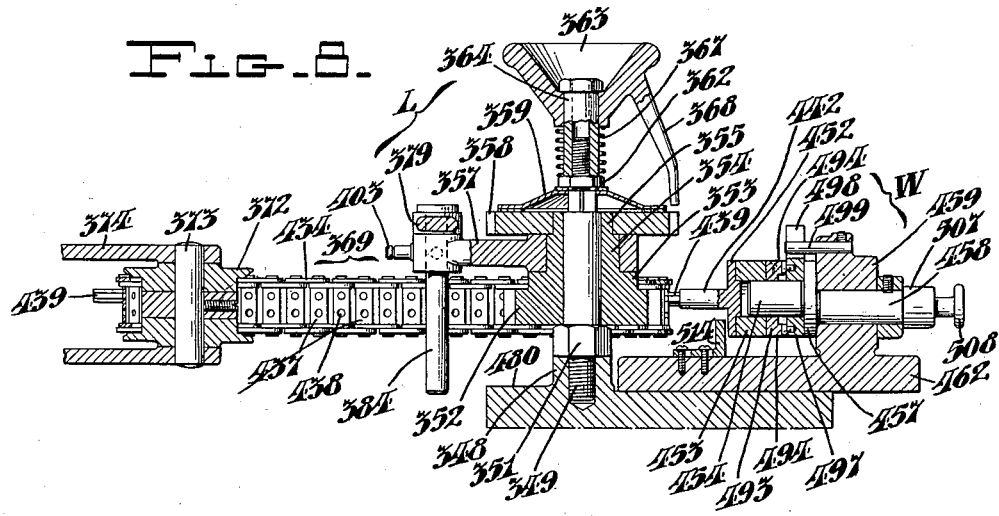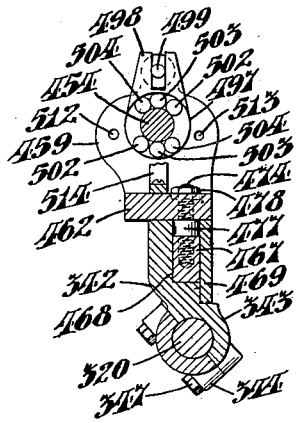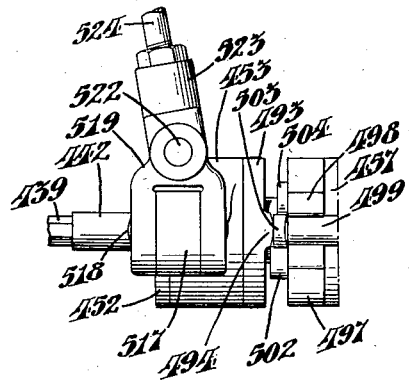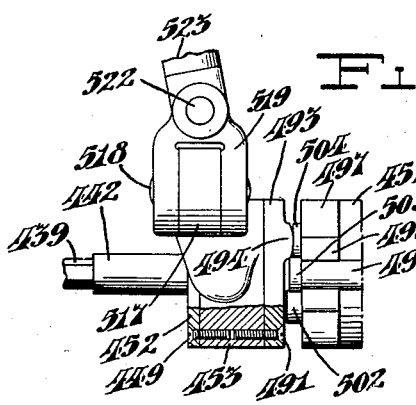

Dec. 5, 1939.                         G. BITZER                         2,182,220
UNIVERSAL MOVEMENT CONTROL FOR POINT MECHANISM OF FLAT KNITTING MACHINES
                    Filed May 21, 1938            10 Sheets-Sheet 5
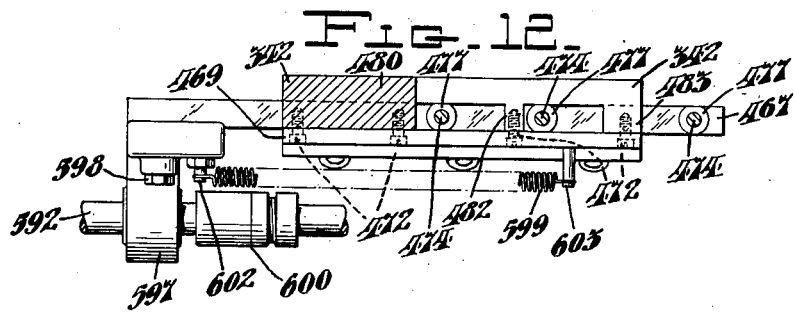
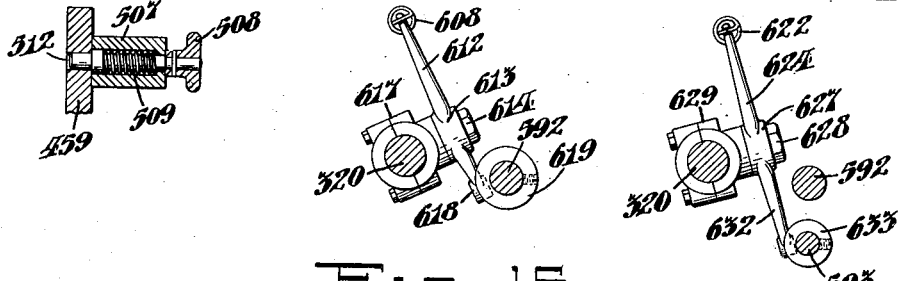
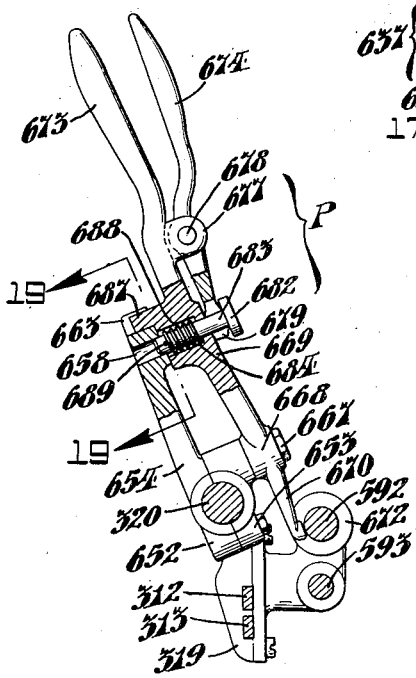
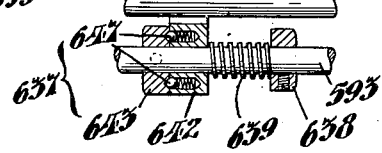
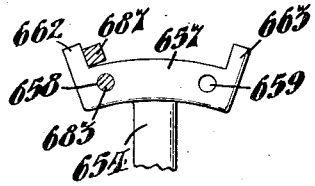
INVENTOR:
Gottlob Bitzer,
BY
ATTORNEY.

Dec. 5, 1939.　　　　　G. BITZER　　　　　2,182,220
UNIVERSAL MOVEMENT CONTROL FOR POINT MECHANISM OF FLAT KNITTING MACHINES
Filed May 21, 1938　　　10 Sheets-Sheet 6
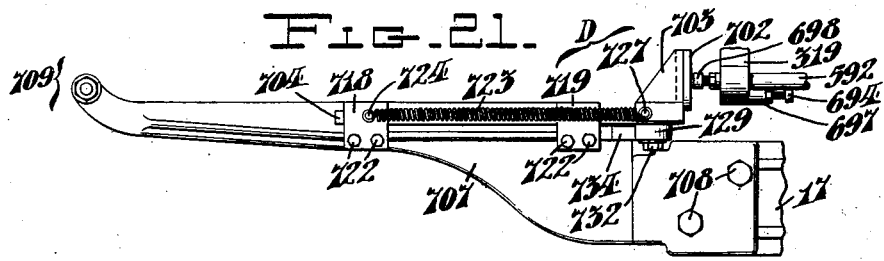
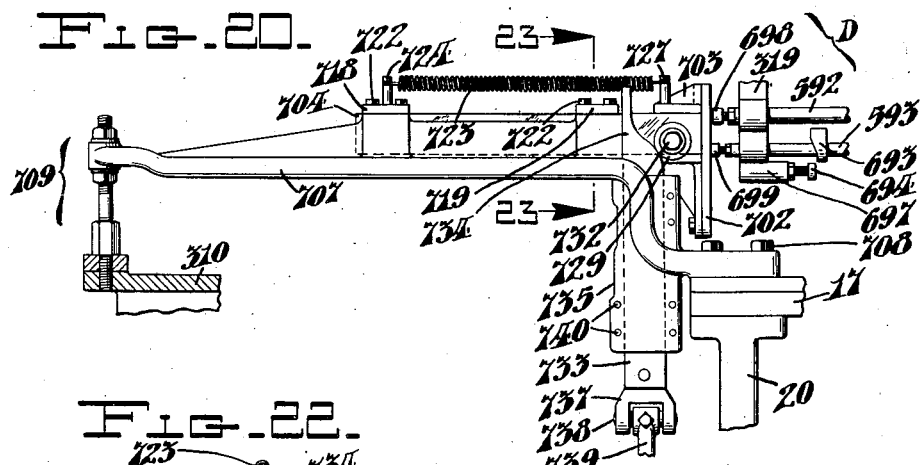
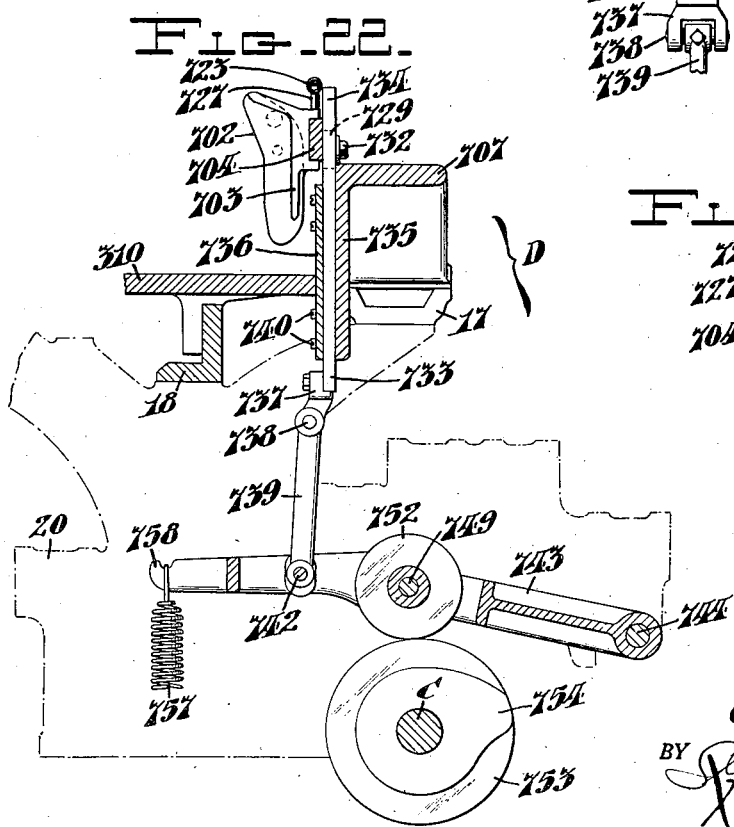
INVENTOR:
Gottlob Bitzer,
BY
ATTORNEY.

Dec. 5, 1939.  G. BITZER  2,182,220
UNIVERSAL MOVEMENT CONTROL FOR POINT MECHANISM OF FLAT KNITTING MACHINES
Filed May 21, 1938   10 Sheets-Sheet 7

INVENTOR:
Gottlob Bitzer,
BY
ATTORNEY.

Dec. 5, 1939.  G. BITZER  2,182,220
UNIVERSAL MOVEMENT CONTROL FOR POINT MECHANISM OF FLAT KNITTING MACHINES
Filed May 21, 1938  10 Sheets-Sheet 8

INVENTOR:
Gottlob Bitzer,
BY
ATTORNEY.

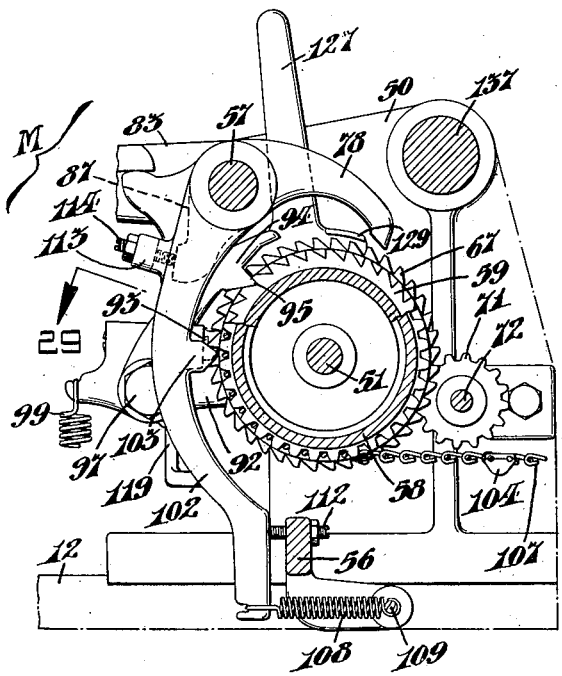
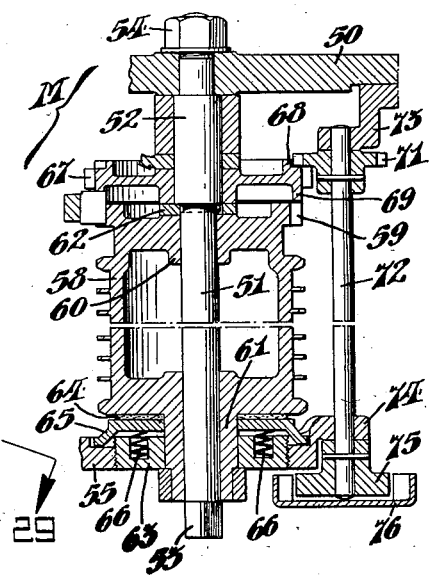
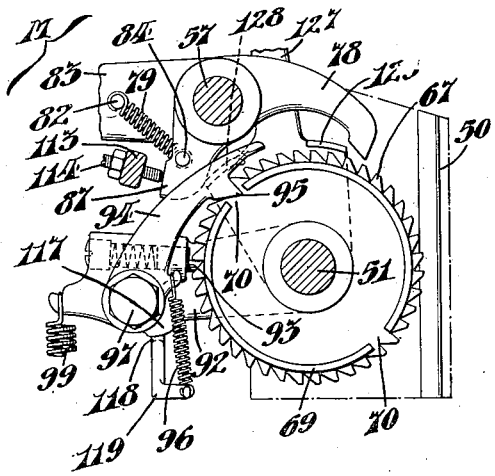
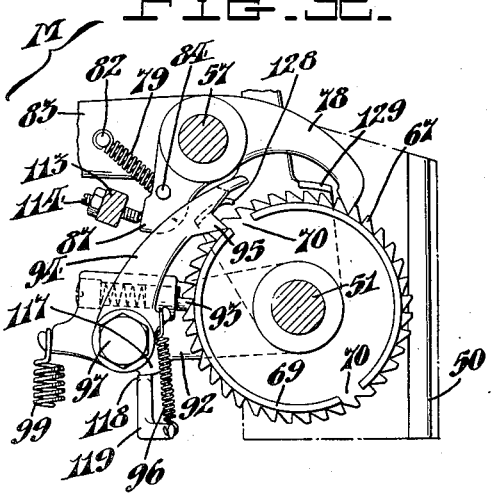

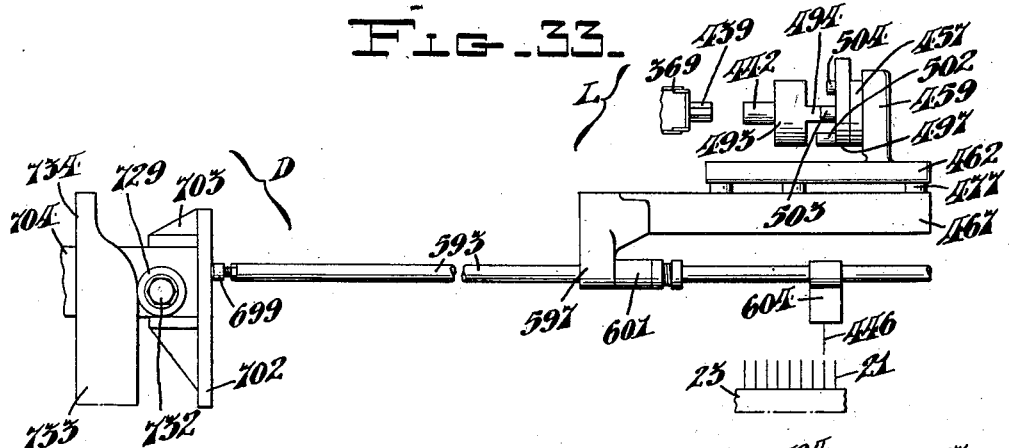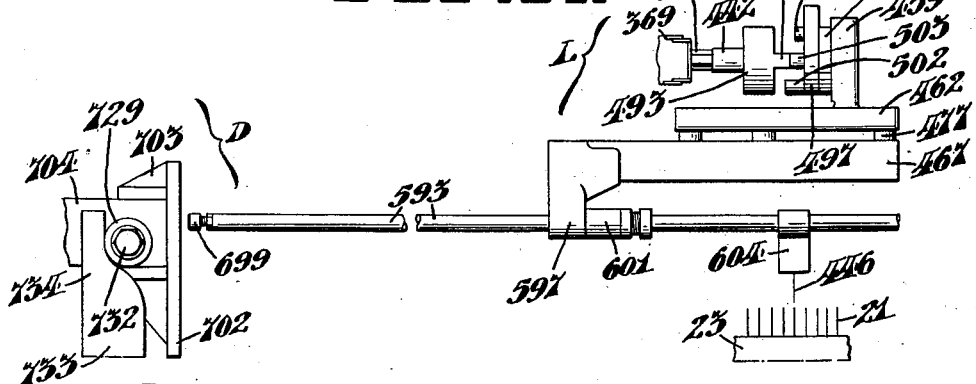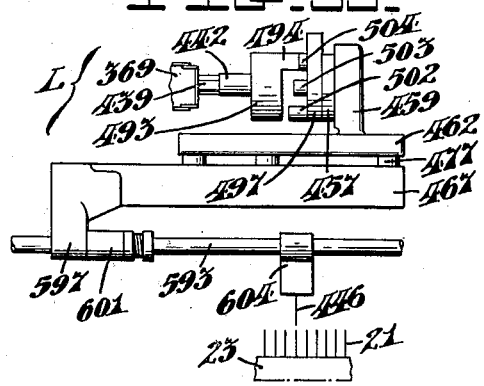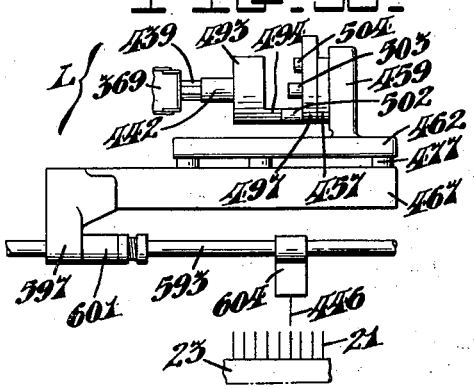

Patented Dec. 5, 1939

2,182,220

UNITED STATES PATENT OFFICE 2,182,220

UNIVERSAL MOVEMENT CONTROL FOR POINT MECHANISM OF FLAT KNITTING MACHINES

Gottlob Bitzer, Lincoln Park, Pa., assignor to Textile Machine Works, Wyomissing, Pa., a corporation of Pennsylvania Application May 21, 1938, Serial No. 209,200

25 Claims. (Cl. 66—96)

This invention relates to knitting machine attachments, and particularly to mechanisms associated with full fashioned knitting machines for producing modified loop formations in fabrics.

Openwork or lace fabric formations produced by knitting machines have required pattern mechanisms of cumbersome, expensive and intricate character, depending upon the variety and kind of figures desired, and, in many instances, manufacturers have operated attachments of reduced pattern ranges instead of attachments of desirably greater pattern producing ability. Such practice is a limitation on the manufacture of the fabrics, reduces the variety of patterns, and causes other inconvenience and loss in certain instances.

Among other objections to openwork or lace producing mechanisms have been space factor, adaptability to certain locations and repair features; there having been no such mechanism that included all of the advantages of compactness, convenience of location, easy repair, and other desirable features.

To avoid certain of the well known lace mechanisms, such as those located at the ends of multi-section full fashioned knitting machines, and which have been particularly subject to objections as above outlined, it has been suggested to employ the so-called "center lace attachments", which, until this invention, although highly successful and desirable in certain applications, have been limited in others. These attachments are carried on the front narrowing shafts, near the centers of full fashioned knitting machines, and, although of compact, desirable character, have been limited in the designs they produce, as above set forth.

It is an object of this invention to overcome certain of the above-mentioned objections, and to provide an openwork or lace attachment for knitting machines, particularly of the multi-section full fashioned variety, that combines certain of the advantages of an end lace mechanism with those of a "center lace attachment."

Another object of the invention is to conserve space, weight and time, in view of increased convenience and variety of pattern in openwork mechanisms of the above-indicated character.

Another object is to facilitate adjustment and selection of patterns, in producing knitted fabrics having openwork formations.

Another object is to very greatly increase the usefulness and range of a center lace attachment, without a corresponding increase in cost, and other undesirable features.

Another object is to meet a persistent demand from the trade for a simple and flexible lace attachment capable of producing fancy lace welt designs, or all-over mesh fabric, in full fashioned stockings.

Another object of the invention is to provide, in combination with a center lace attachment, means other than the attachment itself for effecting shifting movement of lace points.

Another object is to provide a universal movement control for point mechanism of flat knitting machines.

Another object of the invention is to provide a universal movement control for point mechanism of flat knitting machines which may be applied to standard machines with substantially minimum change.

Another object is to provide, in a center lace attachment, for variation in the number and pattern controlling effect of elements movable along the same path, as distinguished from prior attachments of this character requiring a plurality of paths to obtain certain pattern selection.

A further object of the invention is to provide a device of the above-indicated character that is simple and durable in construction, economical to manufacture, and effective in its operation.

With these and other objects in view, which will become apparent from the following detailed description of the illustrative embodiment of the invention shown in the accompanying drawings, my invention resides in the novel elements, features of construction and arrangement of parts in cooperative relationship as hereinafter more particularly pointed out in the claims.

In the drawings:

Figure 1 is a view, in front elevation, of a full fashioned knitting machine embodying the invention, parts being broken away;

Fig. 2 is a cross sectional view of the machine, taken substantially along the line 2—2 of Fig. 1;

Fig. 3 is a detail view, partially in section and partially in elevation, taken substantially along the line 3—3 of Fig. 1, showing, on a slightly smaller scale, parts of a control mechanism thereof for causing lace points of individual lace point bars each to shift right and left;

Fig. 4 is a detail top plan view, taken substantially along the line 4—4 of Fig. 2, and to a slightly smaller scale, of other portions of the mechanism for causing the lace points to shift right and left;

Fig. 5 is a view, in front elevation, and as shown at the upper right hand portion of Fig. 1, of a pattern mechanism, and other parts included in the invention;

Fig. 6 is a top plan view, of the pattern mechanism, and other parts, of Fig. 5;

Fig. 7 shows portions of the structure of Fig. 5, as viewed in the direction of that figure, but moved toward the right, with certain elements taken away, and others added, at the left hand side of the figure, and still further elements in different positions from the positions thereof of Fig. 6;

Fig. 8 is a sectional view, taken substantially along the line 8—8 of Fig. 6, and drawn to a slightly larger scale;

Fig. 9 is a sectional view, taken substantially along the line 9—9 of Fig. 5, on a larger scale, of portions of the lace point control mechanism;

Fig. 10 is an enlarged detail view, in elevation, of portions of the mechanism of Fig. 6, shown at the right of said figure;

Fig. 11 is a view similar to Fig. 10, but with a part in section, of the structure of that figure, and certain of the parts in different positions;

Fig. 12 is an enlarged detail view, partially in top plan and partially in horizontal plane section, taken substantially along the line 12—12 of Fig. 7;

Fig. 13 is a detail section, taken substantially along the line 13—13 of Fig. 1, enlarged relative thereto;

Fig. 14 is a view, similar to Fig. 13, taken substantially along the line 14—14 of Fig. 1;

Fig. 15 is a sectional view, on a slightly enlarged scale, taken substantially along the line 15—15 of Fig. 6;

Fig. 16 is an enlarged detail view taken substantially along the line 16—16 of Fig. 1;

Fig. 17 is a sectional view taken substantially along the line 17—17 of Fig. 16;

Fig. 18 is a view, partially in side elevation and partially in section, taken substantially along the line 18—18 of Fig. 7, but to a larger scale, showing means for moving a picot bar between active and inactive positions;

Fig. 19 is a detail view taken substantially along the line 19—19 of Fig. 18;

Fig. 20 is an enlarged detail front elevational view of portions of a lace point displacer mechanism embodied in the invention, as viewed at the upper left hand portion of Fig. 1;

Fig. 21 is a top plan view of parts shown in Fig. 20;

Fig. 22 is a cross sectional view, taken substantially along the line 22—22 of Fig. 1, of the displacer mechanism of Figs. 20 and 21;

Fig. 23 is a detailed view, in section, taken along the line 23—23 of Fig. 20;

Fig. 29 is an enlarged detail section, taken substantially along the line 29—29 of Fig. 30, parts being broken away, of elements of the pattern mechanism mentioned above;

Fig. 30 is a sectional view, taken from the front of the machine, substantially along the line 30—30 of Fig. 28, of portions of the main pattern device;

Fig. 31 is a view of portions of the main pattern device, taken along the line 31—31 of Fig. 28;

Fig. 32 is a view of the device of Fig. 31, showing certain of the elements in different operative positions; and Figs. 33, 34, 35 and 36 are sequence diagrams of parts of the lace point and control mechanism as viewed in Fig. 1.

Figure 24:
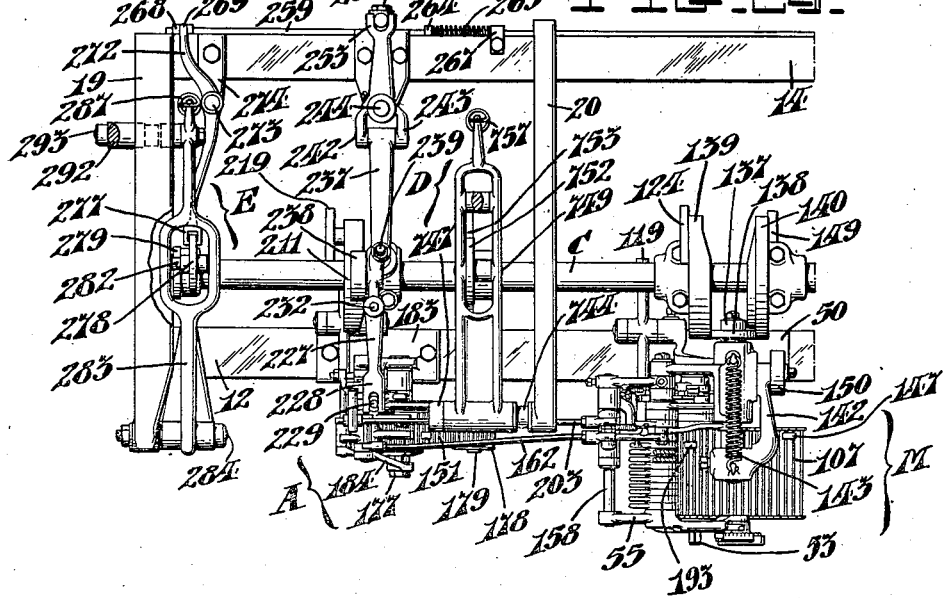
Fig. 24 is a top plan view, taken substantially along the line 24—24 of Fig. 1, of a pattern mechanism and parts of cam shaft shogging elements, and narrowing spindle actuating mechanism controlled thereby.

In the drawings and description, only those parts necessary to a complete understanding of the invention have been set forth; further information as to the construction and operation of other elements not herein specifically pointed out, but which are usual and well known, being available in the pamphlet entitled "Full Fashioned Knitting Machines", copyright 1920, and in the "Reading" Full Fashioned Knitting Machine Catalogues, copyright 1929 and 1935, published by the Textile Machine Works, Reading, Penna., and in a pamphlet entitled "Knitting Machine Lectures", published in 1935 by the Wyomissing Polytechnic Institute, Wyomissing, Pennsylvania.

Referring to the drawings, particularly Figs. 1 and 2, a multi-section full fashioned legger machine, exemplifying one form of mechanism for which the invention is adapted, comprises in general, a frame including parts to be hereinafter mentioned, a power mechanism including a cam shaft C, a main pattern unit M, an auxiliary pattern unit A, a follower shifting mechanism F, narrowing head B, needle bar mechanism N, sinker and divider mechanism S, a lace stitch attachment L, a lace point rod displacer device D, a picot bar manipulating device P, a lace attachment actuator T, a lace attachment control mechanism R, and a narrowing lift mechanism U.

The machine frame is, in general, of usual construction, including a front beam 12, a back beam 14, a front bed 17, a center bed 18, end frames 19, and center frames 20.

The power mechanism includes the power or cam shaft C that is driven, in a usual manner, as by an electric motor, through drive connections (not shown).

The needle bar mechanism N comprises needles 21 held by clamps 22 to a needle bar 23 on a bracket 24, which is pivotally connected, by a pin 25, to a lifting arm 26 on a needle bar lifting shaft 27, on which is also mounted an arm 28 carrying a follower roller 29. The follower 29 cooperates with a contoured cam 30 and a circular cam 38 on the main cam shaft C. The arm 28 is connected, by a spring 31, to a bracket on the back beam 14.

Forward and rearward movement of the needles is effected by a fork 32 fixed to the needle bar 23 and pivotally connected to a lever 33 having a notch 34 for resting the lever 33 on a pin 35 projecting from the side of a presser lever 36. The latter is carried by a presser shaft 37 which is operated by cams on the cam shaft C through cam levers and associated followers (not shown). By lifting the lever 33 to remove the notch 34 from the pin 35, the needles 21 may be moved, from the operative position shown, to an inactive position in which a notch 40 is placed over the pin 35, and which is a position of the needles forward of the sinkers and dividers, for repair work, such as replacement of needles.

The sinker and divider mechanism S comprises a sinker head 41, sinkers 42, and dividers 43, the sinkers being moved forwardly by jacks 44 slurred by a slur cam 45 secured to a cock box 46 mounted on a guide rail 47 for slidable movement transversely to the sinkers and dividers. The cock box is secured to a connecting bar 48, and is reciprocated parallel to the front of the machine, by a usual coulier motion mechanism. The dividers 43 are moved forwardly and backwardly by a usual catch bar (not shown), which receives its movement from a cam on the cam shaft C. The catch bar also moves the sinkers backwardly to be in position to again be slurred forwardly as above set forth.

Figure 28:
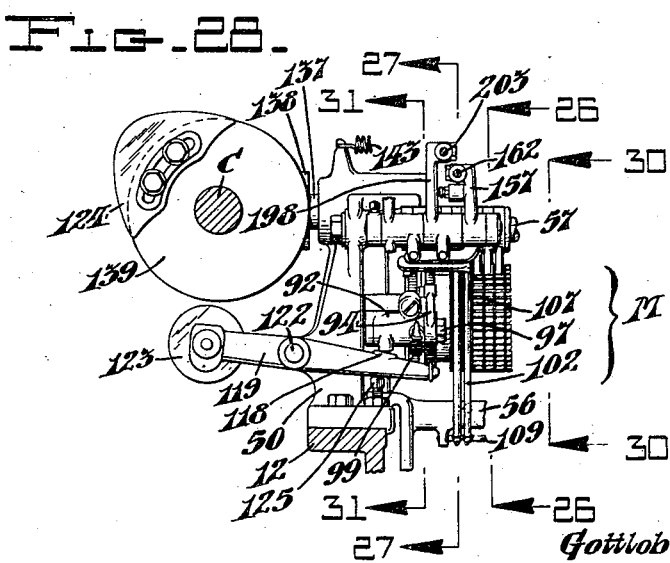
Fig. 28 is a view, taken cross sectionally of the machine substantially along the line 28—28 of Fig. 1, of parts of the mechanism of Figs 24 and 25.

The main pattern unit M (Figs. 1, 24 and 28–32) comprises a bracket 50 on the front beam 12 and a stationary spindle 51 fixed to the bracket by an enlarged portion 52 of the spindle 51, and a nut 54, between which a portion of the bracket is clamped. The spindle 51 has a polygonal front end 53. A front bridge or bracket member 55 is fixed relative to the bracket 50, as by a portion 56 (Figs. 1 and 28), and a stationary shaft 57.

A sprocket wheel or drum 58, having an integral ratchet wheel portion 59 at its rear end, also has a rear bearing portion 60, and a front bearing sleeve 61, journaled on the spindle 51. The rear bearing portion 60 bears against a thrust bearing spacer 62, keyed to the spindle 51, which spacer, in turn, bears axially against the forward end of the enlarged portion 52 of the spindle 51. The sleeve 61, which is journaled, at its inner side, on the spindle 51, is journaled at its outer side, in a nut 63, in the front bridge or bracket 55. A spring biased damper device comprises a fibrous disk or pad 64 on a plate 65 that is biased, by springs 66 in apertures of the nut 63, to press the pad 64 against the front face of the sprocket wheel or drum 58 to brake the rotative action of the sprocket wheel about the spindle 51.

A second ratchet wheel 67, loosely journaled on the portion 52 of the spindle 51, and rotatable relative to the ratchet wheel 59 on the sprocket drum 58, has an integral rear edge gear wheel portion 68 (Fig. 29), and an integral front edge flange portion 69 having diametrically opposite recesses 70. A pinion 71, meshing with the gear wheel 68, is fixed to a shaft 72, journaled in bearings 73 and 74 on the bracket 50 and the bridge 55, respectively, and carries a forward end dial or indicator 75 covered by a member 76 fixedly mounted on the bridge 55 by a pin 77.

A pawl 78, pivotally mounted on the stationary shaft 57, cooperates with the ratchet wheel 67 toward which it is biased by a spring 79 connected between a pin 82, on an arm 83 of the bracket 50, and a pin 84, on an arm 87 of the pawl 78.

Another pawl lever 92, pivotally mounted on the spindle 51, carries a plunger detent pawl 93 for cooperation with the teeth of the ratchet wheel 67, and a pawl 94 pivotally mounted on a pin 97 having ratchet tooth engaging portion 95 that is disposed, in the axial direction of the spindle 51, partially over the teeth of the ratchet wheel 59, and partially over the flange 69. The pawl lever 92 is biased counterclockwise, as viewed in Figs. 1, and 30–32, by a spring 99 connected between the pawl lever and a bracket 100 on the front beam 12. The pawl 94 is biased toward the ratchet wheel portion 59 of the sprocket 58 by a spring 96, connected to the pawl and to a lever 119, hereinafter more fully set forth.

A lever 102, pivotally mounted on the shaft 57, has a follower portion 103 for cooperation with any of buttons 104 carried on the links of a chain 107, on the sprocket wheel 58, toward which the portion 103 is biased by a spring 108. The latter is connected between the lever 102 and a pin 109 connected to the portion 56 which carries a stop screw 112 for limiting movement of the lever 102 toward the chain 107. A member 113, secured to the lever 102, and extending parallel to the spindle 51, carries a screw 114 for engaging the arm 87 of the pawl 78.

The pawl lever 92 has a depending portion 117 for engagement by a portion 118 of the lever 119 that is pivotally mounted, by a pin 122, on the bracket 50, and carries a follower 123 for cooperation with a cam 124 on the main cam shaft C. A stop screw 125, on the bracket 50, limits movement of the lever 119 toward the cam 124.

At each revolution of the cam shaft C with the mechanism positioned as shown in Fig. 31, the pawl lever arm 92, through the plunger detent pawl 93 and the pawl 94, advances the ratchet wheels 67 and 59, respectively, one notch. However, if the pawl 78 is out of engagement with the ratchet 67, as shown in Figs. 30 and 31, such advance of the ratchet wheel 67 will be nullified by the return thereof of one notch, with the plunger detent pawl. Thus, with the idle return of the ratchet wheel 67, the pawl 94 will be permitted to engage the teeth of the ratchet wheel 59 to advance the chain 107 upon each revolution of the cam shaft C.

When one of the buttons 104, on the chain 107, forces the lever 102 clockwise about the shaft 57, as viewed in Fig. 30, the contact screw 114 disengages the arm 87 of the pawl 78, which is thereby moved clockwise by the spring 79 against the ratchet wheel 67, whereby upon subsequent notchings of the wheel 67, by the plunger detent pawl 93, the wheel will be prevented from returning with each notching, as above set forth. Upon notching of the ratchet wheel 67, the pawl 94 will be disengaged from the teeth of the ratchet wheel 59 by the flange portion 69 of the ratchet wheel 67, Fig. 32, thus preventing the advance of the chain 107.

When the wheel 67 has been thus notched twenty times, from the position of Fig. 32, in which the tooth engaging portion 95 of the pawl 94 is riding on the flange 69, this portion 95 will drop into one of the recesses 70, Fig. 31, and engage a tooth of the ratchet wheel 59, thereby advancing the main pattern chain 107 and throwing the button 104 from under the follower portion 103 of the lever 102, again engaging the screw 114 to the arm 87 of the pawl 78, and resuming the idle forward notching of the ratchet wheel 67; the chain 107 thus being advanced a distance of at least one link for each twenty teeth, or half the number of teeth, on the ratchet wheel 67. When it is desired to continuously advance the ratchet wheel 67, the chain 107, upon being advanced to remove one of the buttons 104 from beneath the lever 102, will immediately move another button 104 beneath the lever 102, to again engage the pawl 78 with the teeth of the ratchet wheel 67, whereupon the pawl 94 is again removed from engagement with the teeth of the ratchet wheel 59 while the ratchet wheel 67 is notched twenty times. The dial 75 is provided to indicate how many of the teeth of the wheel 67 have been advanced, for the information of the operator, if the machine should be stopped at an intermediate stage of the operation of the wheel 67.

A handle lever 127 has portions 128 and 129 for cooperation with the pawls 94 and 78, respectively, for manually throwing these pawls out of engagement with the ratchet wheels, if it is desired to move the chain 104 one way or the other, by attaching a hand crank (not shown) to the polygonal end 53 of the spindle 51.

A stub shaft 137 (Fig. 24) is journaled in the bracket 50 transversely to the cam shaft C, and carries a follower 138 disposed between shogging cams 139 and 140 on the cam shaft C.

A member 142 is fixed at one end to the stub shaft 137 and is slidably supported parallel to the shaft on the bracket 50. A tension spring 143 is connected between the slide member 142 and the stationary bracket 50, and tends to move the stub shaft 137 whereby to move the follower 138, from its normal knitting position, between the shogging cams 139 and 140, to its narrowing position, also between these cams, wherein it engages face cam portions of the cams to shog the cam shaft C. This tendency of the spring 143 is normally prevented by a latch 144 (Fig. 26), which is released by one of a plurality of buttons 147 on the chain 107, or by one of a plurality of buttons 148 on a chain 151 of the auxiliary pattern unit A, as will hereinafter be set forth.

The stub shaft 137, and the follower 138 thereon, are returned to inactive position, against the action of the spring 143, by cooperation between a cam 149, on the cam shaft C, and a follower 150 on the slide member 142.

The latch 144 is pivotally mounted on the stationary shaft 57, and connected, by a link 152, the pivot pins 153 and 154, to a lever arm 157, that is pivotally mounted on a stationary shaft 158, on the arm 83 of the bracket 50. A link 162 is pivotally connected at one end, by a pin 163, to the lever arm 157, and, at the other end, is pivotally connected, by a pin 164, to one arm 167 of a crank 168 that is pivotally mounted on a stationary shaft 169. Another arm 172, of the crank 168, carries a device 173 for contact with the buttons 148 on the chain 151; this device being slidable laterally to the arm 172, for positioning in line with another row of buttons on the chain 151, or to be thrown to inactive position aside the chain, and held by a plunger detent not generic to this invention.

The chain 151 is driven by a sprocket wheel 174 on a stationary shaft 177, and is held in position by an idler sprocket wheel 178 on a shaft 179 in a bracket 182 on the front beam 12. The shafts 169 and 177 are parts of a stationary frame including a bracket 183 on the front beam 12, and a front bridge member 184.

Figure 27:
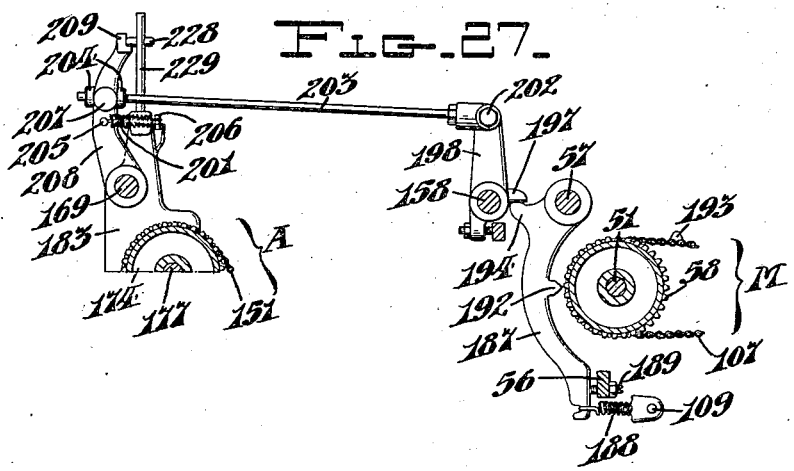
Fig. 27 is a sectional view, also taken from the front of the machine near the lower left hand portion thereof, as viewed in the direction of Fig. 1, substantially along the line 27—27 of Fig. 28, of elements of the pattern and cam shaft shogging mechanisms above mentioned.

As better seen in Fig. 27, the shaft 57 further carries a lever 187 biased toward the chain 107 by a spring 188, and limited in such movement by an adjustable stop screw device 189. The lever 187 also has a follower portion 192 for engagement by one button 193 of a plurality on the chain 107, and a side projection or dog 194 for engagement by a lug 197 of a lever 198 on the shaft 158. The lever 198 is pivotally connected, by a pin 202, to one end of a link 203 that is pivotally connected, at its other end, by collars 204, to a pin 207 carried by a latch lever 208. The latter is pivotally mounted at its lower end, on the shaft 169, and, at its upper end, has a latch shoulder 209 for controlling the lowering of a follower 210, Fig. 25, into operative engagement with a face cam 211 on the cam shaft C. A spring 201, connected between a pin 205 on the lever 208, and a pin 206 on the bracket 183, biases the lever 208 clockwise about the shaft 169, as viewed in Fig. 27.

Figure 25:
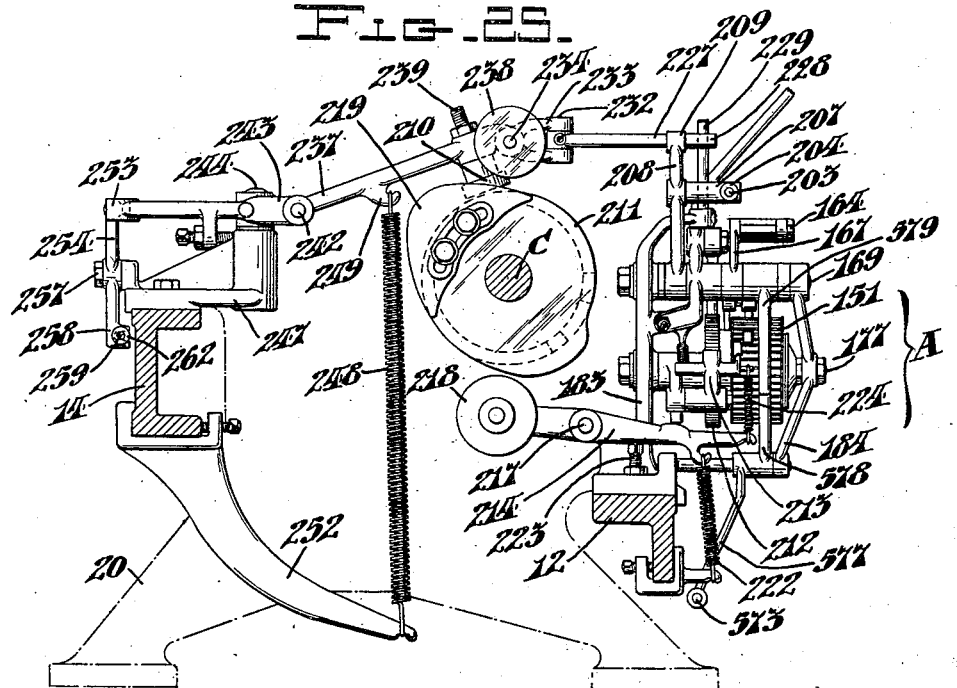
Fig. 25 is a view, taken cross sectionally of the machine substantially along the line 25—25 of Fig. 1, of certain of the structure shown in Fig. 24.

The auxiliary pattern chain 151 is advanced independently of the main pattern chain 107, but synchronously therewith, and by similar mechanism, as better seen in Fig. 25, comprising a ratchet wheel 212, on the sprocket wheel 174, and operated by a pawl 213, pivotally mounted on the bracket 183. The pawl 213 is intermittently actuated by a lever 214 pivotally mounted on the bracket 183 by a pin 217, and carrying a follower 218 for operation by a cam 219 secured to the face cam 211. A spring 222 biases the follower 218 toward the cam 219, and against a stop screw 223 on the bracket 183, and a spring 224 biases the pawl 213 toward the ratchet wheel 212.

The latch shoulder 209 cooperates with a lever 227 having, at its forward end, a bifurcated portion 228 embracing a stationary upright rod 229 fixed to the bracket 183. The other end of the lever 227 is pivotally connected, by a vertical pin 232, to the forward end 233 of a link or lever 237; a pin 234 being provided for carrying a follower 238 for cooperation with the periphery of the cam 211, and the follower 210 being rotatably mounted on the lever 237, by a pin 239. The link 237 is pivotally connected, by a horizontal pin 242, to a lever 243 that is pivotally mounted, by a vertical pin 244, in a bracket 247 on the back beam 14. A spring 248, connected between a hook portion 249 on the link 237 and a bracket 252 on the back beam 14, tends to move the follower 210 downwardly against the action of the latch 209.

The lever 243 has a bifurcated portion 253, at its rear end, embracing the top end of a lever 254 that is pivotally mounted, by a pin 257, on the bracket 247 and has a forked lower end 258 embracing a horizontal rod 259 to which it is pivotally held, as by collars 262.

The rod 259 is biased toward the left, as viewed in Fig. 24, by a spring 263 surrounding the rod, between a collar 264 on the rod and a member 267 fixed to the back beam 14. The rod 259 is similarly pivotally connected, between collars 268, to a forked end 269 of a lever 272 that is pivotally mounted, by a vertical pin 273, in a bracket 274 on the back beam 14. The lever 272 has a bifurcated forward end 277 that embraces a follower 278 for cooperation with a cam 279 on the cam shaft C. The follower 278 is axially slidably mounted on a shaft 282 carried by a lever 283 that is pivotally mounted, by a pin 284, on an end frame 19 of the machine and biased toward the cam by a spring 287.

An upright arm or link 292 is connected at its lower end, by a pin 293, to the lever 283 and carries mechanism at its upper end, including pawls for actuating usual ratchet wheel devices 297 of the narrowing head B. The latter comprises a usual spindle 298, rotatably mounted in brackets 309 mounted on a base plate 310 secured to the center bed 18, including reversely threaded screw portions 299 and 302, for operating narrowing nuts 303 and 304, respectively, having portions 307 by which they are guided along a stationary rod 308 supported in brackets 309.

Usual narrowing rods 312 and 313 carrying point combs 317 and 318, respectively, are longitudinally slidably journaled in brackets 319 on a front narrowing shaft 320 that is connected, by arms 322, to a rear narrowing shaft 325 journaled in brackets 326 on the machine frame. Dipping movement of the front narrowing shaft 320, about the axis of the rear narrowing shaft 325, as a pivot, is effected by the mechanism U through links 327 that are each pivotally connected, at the upper end, to the front narrowing shaft, and, at the lower end, to a lever 328. The latter is pivotally mounted, by a pin 329, to the machine frame, and carries a follower 332 for cooperation with circular and contoured cams 333 and 334, respectively on the cam shaft C.

Referring particularly to Figs. 5-11, the lace stitch attachment L comprises a base 342 having a portion 343 clamped in fixed relation to the front narrowing shaft 320 by a complementary clamp member 344 and bolts 347; the base member 342 having a boss 348 in which an upright stud or shaft 349 is screw threadably mounted, and secured, as by a nut 351 having rotatably mounted thereon a sprocket wheel 352, this wheel having, as seen in Fig. 8, portions of successively smaller diameter providing, respectively, a thrust bearing rest 353 for a pawl carrying lever 357, a bearing 354 which the lever 357 surrounds and a portion 355 to which is secured a ratchet wheel 38. A friction disk device 359 operates between a nut 362 on the stud 349 and the top face of the ratchet wheel 358 to damp the movement of the latter about the stud. A handle 363, slidably mounted on a sleeve 364 constituting an extension of the stud 349 is biased upwardly thereon, by a spring 367, to normally hold a finger 368 out of engagement with the teeth of the ratchet wheel 358, but to permit engagement of the teeth by the finger, by pressing the handle 363 downwardly. When this is done, the ratchet and sprocket wheels 358 and 352 may be rotated to manually adjust the position of a chain or pattern element receiving base 369 extending around the sprocket wheel 352, and around an idler sprocket wheel 372. The latter is journaled on a pin 373 in a fork 374 that is mounted at one end of a rod 377 longitudinally adjustably fixed in brackets 378 fast on the front narrowing shaft 320; the arrangement being such as to give a base support of substantial length along the front narrowing shaft 320 for the idler sprocket wheel 372, and to provide for adjustment of the latter toward or away from the main sprocket wheel 352, whereby to shorten or lengthen the chain 369 by the removal or addition, respectively, of links.

The lever 357 carries a pawl 379, biased toward the ratchet wheel 358 by a spring 382 and having a handle 383 for moving the pawl to inactive position relative to the ratchet wheel when desired. The pawl 379 is pivotally mounted on the lever 357 by a pin 384 that depends from the lever to a position in the path of movement of a horizontal pin 387 mounted in, and projecting from the side of, a lever 388 pivotally mounted on the front narrowing shaft 320 and constituting an element of a linkage between the attachment L and the cam shaft C.

The pin 387 pivotally connects the outer end of the lever 388 to a forward clevis end portion 389 of a lever arm 392 that is pivotally connected, by a pin 394, to a lever 397 that is pivotally mounted on the back narrowing shaft 325, as by a split bearing structure 398. A spring 399, connected between a hook portion 402 on the lever arm 392, and a pin 403 on the lever 357, biases the pin 384 toward the pin 387.

The lever 397 is further pivotally connected, by a pin 404, to an upper end element 407 of a link 408, the lower end of which is pivotally connected, by a pin 412 to one arm 413 of a lever 414. The latter is pivotally mounted, by a pin 417 in brackets 418 secured to the back beam 14, and has another arm 419 on which a follower 422 is mounted, by a pin 423, for cooperation with contoured and circular cams 424 and 427, respectively, on the cam shaft C. A spring 428 is connected between a hook portion 432 on the arm 413 and a stationary part of the machine frame, such as a bracket on the back beam 14, for biasing the follower 422 toward its cams 424 and 427.

The chain 369 comprises side links 434 and cross pieces 437 each provided with a plurality, in this case two, of apertures 438 for the reception of pattern elements or buttons 439, thereby arranged in parallel rows along the chain for cooperation, one row, or along one path at a time, with a follower 442 on the order of a plunger that operates lengthwise, or back and forth, in line with any particular one of the buttons 439 which is in position on such line, as controlled by the chain at the time. The buttons 439 are of various lengths to respectively determine the distance, or number of needles, over which lace points 446 or the points 447 of a piect bar 448 may move to effect the desired pattern, as will further appear.

The plunger follower 442 projects from a disk 452 constituting part of an eccentric device W for not only determining the direction of shift of the points 446 and 447, after the positioning of these points has been determined by the button 439 under the plunger 442, but also for adjusting the plunger to operate with one or another of the rows of buttons 439.

The disk 452, on which the plunger 442 is disposed, is fixed as by screws 449 (Fig. 11), to a sleeve 453 rotatably journaled on a trunnion or stud 454 that is concentrically fixed to one side of a disk 457 to the other side of which is eccentrically fixed a stud or trunnion 458 journaled in a bearing portion 459 on a member 462.

The member 462 is mounted on a slide bar 467 disposed in a slideway formed by a substantially rabbet groove 468 in the base 342, and by a plate 469 secured to the base, as by screws 472. Studs 474, having flat sided spacer enlargements 477 between the slide bar 467 and the member 462, are screw threadably secured to the bar 467 and held by nuts 478. As seen in Fig. 12, one of the studs 474 is disposed, in the slideway formed by the groove 468 and the plate 469, between a portion 480 of the base 342, and a cross portion or partition 482 on the base 342. Another of the studs 474 is disposed in the slideway between the partition 482 and another partition or end portion 483 on the base 342, and a further stud 474 is entirely outside the slideway. The plate 469 is also secured to the partitions 482 and 483 by the screws 372. This arrangement, although providing for ready assembly and disassembly of the parts, prevents withdrawal of the slide member 462 in any direction.

A face cam disk 493 is fixed, as by screws 491, to the sleeve 453 and has a pair of diametrically opposite cam portions 494 of the same length. A non-rotative member 497 of disk like character having a perimetrical forked radial projection 498 is loosely mounted on the stud 454 between the face cam disk 493 and the disk 457, and adapted for vertical movement, while being maintained non-rotative by a pin 499 disposed between the legs of the fork 498 and secured to the bearing portion 459. The non-rotative member or disk carries, at its side facing the cam portions 494 of the disk 493, duplicate sets of buttons, each including a long button 502, a button 503 of intermediate or neutral length, and a short button 504, each of these buttons of each set being diametrically opposite the corresponding button of the other set, so that no matter which button is engaged by either of the long cam portions 494 the other cam portion 494 simultaneously engages a button of the same length, and since the cam portions 494 are of equal lengths, the feature provides a balanced double acting face cam action. This relation is undisturbed irrespective of which row of the buttons 439 the plunger 442 is opposite, as determined by a crank arm 507, better seen in Fig. 6. This arm has a plunger detent operating handle 508 having an inner end for position, biased by a spring 509 (Fig. 15), in either of recesses 512 and 513 in the bearing portion 459 depending upon which row of the buttons 439 the plunger 442 is opposite. To change the plunger 442 from position opposite the top row of buttons, as illustrated, to position opposite the bottom row of buttons, the handle 508 is moved to the right, as viewed in Fig. 6, to release it from the recess 512, and then turned one hundred and eighty degrees to allow the handle to snap, by spring action, into the recess 513, during which action, the member 497 merely slides between the disks 457 and 493. A stop member 514, adjustably secured to the slide member 462 is provided to prevent displacement of the assembly, including the disk 452, the sleeve 453, and the face cam disk 493 from the stud 454.

The arrangement whereby the number of links 434, cross pieces 437 and buttons 439 may be varied at will, provides means, novel in center lace attachments, for varying the number and pattern controlling effect of elements, such as the buttons of each row, for movement along the same path. That is, in which such variation can be effected in one or both rows, or along one or both paths, without changing from one path to another before any selection can be had, as in disk cam devices.

Linkage, between the attachment L and the cam shaft C, comprises an arm 517 projecting radially from the side of the sleeve 453, pivotally connected at its outer free end, by a horizontal pin 518, Fig. 3, to a yoke 519 that is pivotally connected, by an upright pin 522 to one end element 523 of a link 524. A rear end element 527 of the link 524 is pivotally connected, by a pin 528, to an upper forked end 529 of a link 532 that is pivotally connected at its lower end, by a pin 533, to the upper end of a lever 534. The latter is pivotally mounted on the back narrowing shaft 325, as by a split bearing 537, and is pivotally connected, by a pin 538, to the upper end of a link 539 having a lower end pivotal connection 542 to one arm 543 of a lever 544. The lever 544 is pivotally mounted, by the pin 417, in the brackets 418, on the back beam 14, and has another arm 549 on which followers 552 and 553 are pivotally mounted by a pin 554.

The follower 553 is embraced by a fork end 557 of a lever 558 that is pivotally mounted, by a vertical pin 559 on a bracket 562, on the front beam 12. An end 563 of the lever 558 is, in turn, embraced by a fork end 564, Fig. 4, of another lever 567 that is similarly vertically pivoted on the bracket 562 by a pin 568 and having a depending arm 569. The latter is disposed between collars 572, and thereby pivotally connected to a rod 573 extending along the front beam 12 to a similar pivotal connection 574 to a lower arm of a lever 577 of the auxiliary pattern unit A. An upper arm 578 of the lever 577 cooperates with a lever 579 pivotally mounted on the stationary shaft 169. A spring 582, surrounding the rod 573, engages at one end a bracket 583, on the front beam 12 in which bracket the rod 573 is slidably supported, and, at the other end, presses against a collar 584 fixed to the rod 573 for biasing the latter toward the right, as viewed in Fig. 1. The follower 552 cooperates with a contoured cam 587 and a circular cam 588, and the follower 553 cooperates with a cam 589 on the cam shaft C.

A picot point rod 592, and a lace point rod 593 are supported along the front of the machine by the narrowing rod supporting brackets 319. Both the picot point rod 592 and the lace point rod 593 are longitudinally slidably embraced by a member 597 (Figs. 1, 5, 6, 7 and 12) depending from the left end of the slide bar 467, as viewed in the drawings, and secured in position as by a screw 598.

A spring 599 is connected between a pin 602, on the member 597, and a pin 603, on the plate 469, and tends to bias the member 597 and the slide member 462 toward each other. Elements 600 and 601, on the rods 592 and 593, respectively, in the active positions thereof, are engaged by the member 597, such engagement being shown only as to the element 601 in Fig. 5. The element 600, in this figure, is in inactive position, not engageable by the member 597. The lace points 446 are secured to the lace point rod 593 by brackets 604. The picot bar 448 is secured to the picot point rod 592 by lever arms 607.

The picot point rod 592 is biased to the left, as viewed in Fig. 1, by a spring 608 connected between an arm 609, fixed to the front narrowing shaft 320, and an upper arm 612, see also Fig. 13, of a lever 613 that is pivotally mounted, by a pin 614, to one member of a clamp 617 fixed to the front narrowing shaft 320. The lever 613 has a shorter lever arm 618 engaging a collar 619 that is fixed to the picot point rod 592, as by a set screw.

Similarly, the lace point rod 593 is biased to the left by a spring 622 (Figs. 1 and 14) connected between an arm 623, fixed to the front narrowing shaft 320, and an upper arm 624 of a lever 627 that is pivotally mounted, by a pin 628, to a clamp 629 fixed to the front narrowing shaft 320. The lever 627 has a lower arm 632 engaging a collar 633 fixed to the lace point rod 593.

As shown in Figs. 1, 16 and 17, a device 637 for accentuating the position of the lace points 446, in either active or inactive position, comprises a collar 638 fixed to the lace point rod 593, a spring 639 surrounding the rod between the collar 638 and a member 642, and another collar 643 fixed to the rod 593. The member 642, loosely mounted on the rod 593, has upper arms 644 embracing the picot point rod 592, and axially extending recesses containing spring biased ball detent elements 647 cooperating with recesses in the adjacent face of the collar 643. The entire device 637 shifts with the rod 593, and when the latter is turned from active to inactive position, or from inactive to active position, the member 642, by the relation of its arms 644 to the picot point rod 592, holds the ball detent elements 647 for engagement with the recesses in the collar 643.

As shown in Fig. 1, but better seen in Figs. 7, 18 and 19, the device P, for moving the picot point rod 592 to inactive position, and holding it in such position, against the action of the spring 608, comprises cooperating members 652 and 653 clamped to the front narrowing shaft 320. The member 652 has an arm 654 on which is supported a cross head 657 having end recesses 658 and 659, and end stops 662 and 663. The clamp member 653 supports a pin 667 on which is pivotally mounted a lever 668 having upper and lower arms 669 and 670, respectively. A collar 672, fixed to the picot point rod 592, is held against the lower end of the arm 670, by the spring 608 (Figs. 1 and 13). The upper arm 669 of the lever 668 has a handle 673 and a grip arm 674 pivotally connected to lugs 677 on the handle, by a pin 678. The grip arm 674 has a forked lower arm 679 disposed under a head 682 of a plunger rod 683 extending through an aperture 684 in the arm 669 into the recess 658, in which position the picot point rod 592 is locked in inactive position, with a dog 687 on the arm 669 against the stop 662. A spring 688, surrounding the plunger rod 683, in the recess 684, between a forward portion of the arm 669 and a pin 689 in the plunger rod 683, biases the latter toward the recesses 658 and 659.

To release the picot point rod 592 for movement to active position to the left, as viewed in Figs. 1 and 7, by the action of the spring 608, the handle 673 and the grip 674 are grasped, the grip pressed inwardly, and the plunger rod 683 withdrawn from the recess 658, upon which action, the spring 608 causes the lever 668 to pivot clockwise about the pin 667 until the dog 687 hits the stop 663, and the plunger rod 683 is forced by the spring 688 into the recess 659. The reverse operation of throwing the rod 592 to inactive position is the same, except that the handle 673 is moved against the action of the spring 608, instead of with it.

For throwing the lace point rod 593 to inactive position, a handle 692, shown just under the right end of the picot bar 448 at the top center of Fig. 1, constitutes a fixed radial arm on the rod 593 whereby to turn the lace points 446 upwardly one hundred and eighty degrees, from the lower active position illustrated. When this is done, a cam block 693, see also Fig. 7, engages the transverse end surface of a screw 694 to move the rod 593 to the right, from the position of Fig. 1. In Fig. 7, the cam 693 is not in position to properly engage the screw 694, since this position is an operating position of the rod 593 during reciprocation of which the handle 692 is not to be operated. The screw 694 is mounted in an extension 697 of one of the brackets 319 that is fixed to the front narrowing shaft 320.

The picot rod 592, and the lace point rod 593, carry axially extending left end screws 698, and 699, respectively (Figs. 1, 7 and 20), which, in the active positions of the rods, engage a face plate 702 of a head member 703 of a horizontal longitudinally reciprocable slide bar 704 mounted on a stationary member or bracket 707. The latter is secured at its right end, as viewed in Figs. 1, 20 and 21, to the front bed 17, as by screws 708, and, at its left end, is supported on the base plate 310 by a vertically adjustable stud arrangement 709. The slide bar 704 is held in a groove 717 (Fig. 23) of the bracket 707, by overhanging cap members 718 and 719 that are secured in position, as by screws 722. A spring 723, connected between a pin 724 on the cap member 718, and a pin 727 on the head member 703, biases the slide bar 704 to the left, or away from the rods 592 and 593.

A roller 729, journaled by a pin 732 on the slide bar 704, constantly engages a vertically reciprocable cam bar 733 having, at its upper end, a cam head 734, and secured, at its lower end, by a clevis 737, and a pivot pin 738, to the upper end of a link 739. The bar 733 is journaled in a groove provided in a portion 735 of the bracket 707, and held in position by a plate 736 secured to the portion 735, as by screws 740. The link 739 is pivotally connected, at its lower end, (Fig. 22) by a pin 742, to a lever arm 743 that is pivotally mounted on a pin 744 which is journaled, at one end, in one of the center frames 20, and, at the other end, in a member 747 fixed to the upper end of an upwardly extending portion 748 of the bracket 182.

The lever arm 743 supports a pin 749 on which is rotatably supported a follower 752 for cooperation with a circular cam 753, and a contoured cam 754, on the cam shaft C. The follower is biased toward the cam by a spring 757 that is connected between a hook portion 758 of the lever arm 743 and a stationary part of the machine frame.

Although adapted to other machines, and to other operation therein, and in the legger machine given by way of example, the invention as shown, provides only for making lace design and a picot course in the welt, it being understood however, that by substituting a lace bar, having a series of lace points, for the single point 446, or for the picot bar 448, and other changes effected, such as variation in the positions of the buttons on the pattern chains 107, 151 and 369, that other modified loop formations may be produced, such as non-run, run resist, and the like. The picot bar 448 makes a complete picot course in one operation, whereas, if it is desired to use a lace bar, in the place of the picot bar, as by removing certain of the points 447, such picot course may also be effected by an appropriate additional number of operations of the bar.

Also, both the picot points 447 and the lace points 446 may be thrown to the upper or inactive positions thereof at the same time, the lace points 446 being shown in lower active position, ready for operation at a certain position in the welt of a leg blank after plain knitting has been done to such position. It should also be understood that either the lace points 446, or the picot points 447, may be in the lower or active position for operation, but not both.

With the points positioned as in Fig. 1, the cam shaft C being in its left hand position, the machine is adapted for plain knitting, in a usual and well known manner, in which position of the cam shaft, the follower 278, farthest to the left in the figure, is spaced to the right of its actuating cam 279 by a distance equal to twice the width of the cam, so that the usual shogging of the cam shaft, without shifting the follower 278 toward the cam, will not place the follower on the cam, and consequently the narrowing head B will not be actuated. Also, at this time, the cam follower 210 (Fig. 25), is not cooperating with the face cam 211, which is next to the right of the cam 279 and will not cooperate with it, merely by shogging of the cam shaft, since it is latched out of position for such cooperation by the latch shoulder 209

The cam 754, next to the right of the face cam 211 does not, during plain knitting, cooperate with the follower 752 which is riding on the circular cam 753, but is ready for cooperation with the contoured cam 754 when the cam shaft C is shogged. Consequently, the cam head 734 is maintained in its position of Figs. 1 and 20. The cams next to the right of the cam 754 are, of course, the shogging cams 139 and 140 themselves. Next to the right of the shogging cam 140, the follower 332, during plain knitting, rides on its circular cam 333, ready for cooperation with the contoured cam 334, upon shogging of the cam shaft C, to cause dipping movements of the front narrowing shaft 320. Next to the right of the dipping cam 334, the follower 422, for actuating the mechanism for advancing the chain 369 of the device L, is on its circular cam 427 during plain knitting, ready to begin advancing the chain 369, when the cam shaft C is shogged.

Next to the right of the cam 427, is the follower 552, on its circular cam 588, and next the follower 553, not on any cam. These cams are connected to the face cam disk 493 of the attachment L, to determine the direction of shift of the lace points 446, or the picot points 447. As thus positioned, shogging of the cam shaft C is all that is required to place the follower 552 on the cam 587 to cause a left shift of the lace points, through the linkage seen in Figs. 3 and 10. Note that, in this action, the follower 552 goes from the circular cam, equal to the high portion of the cam 587, to the latter, and then to the low portion of the cam 587. This causes counterclockwise motion of each of the levers 544, 534 and 517, causing the cam portion 494 of the disk 493 to move from the neutral button 503 to the short button 504, whereby the spring 599 shifts the slide bar 467 to the left, this action correlating the parts as controlled by the mechanism of Fig. 20, to cause the lace points to shift to the left. When a right shift is desired, the follower 553 is shifted by the fork 557 to the cam 589, and since the followers 552 and 553 are both on the pin 554, and the cam 589 has a high point relative to the circular cam 588, the follower 522 will not be allowed to follow the cam 587. Consequently, the levers 544, 534 and 517 will be moved clockwise to move the cam portion 494 from the neutral button 503 to the long button 502, and to cause the lace points to shift to the right.

Next to the right of the cam 589, the needle lifting follower 29 is on its actuating or contoured cam 30, ready for shifting to its narrowing cam 38 when the shaft is shogged. Next to the right of the needle lifting cam 30, are further cams 333 and 334 similar to the cams 333 and 334 already mentioned and operating the same, and at the same time, it being usual in multi-section machines of this type, to provide a multiple of such mechanisms.

The lever 119 for actuating the advancing pawl mechanism of the main pattern unit M, and the similar lever 214, for actuating the advancing pawl mechanism of the auxiliary pattern unit A, are actuated at each rotation of the cam shaft throughout the entire operation of the machine, irrespective of the longitudinal position of the cam shaft, since the cam followers 123 and 218 are wide enough, and so positioned in the plain knitting position, to also retain contact with the cams 124 and 219 in the narrowing position of the cam shaft. Thus, the auxiliary pattern chain 151 continuously advances, but the main pattern chain, by reason of the counter mechanism of Figs. 29-32, and the above-described idle back-and-forth motion of the ratchet wheel 67, remains stationary for at least twenty courses of plain knitting such courses of equal number of loops, and starts a new series of twenty, when, and as often, as desired.

Figure 26:
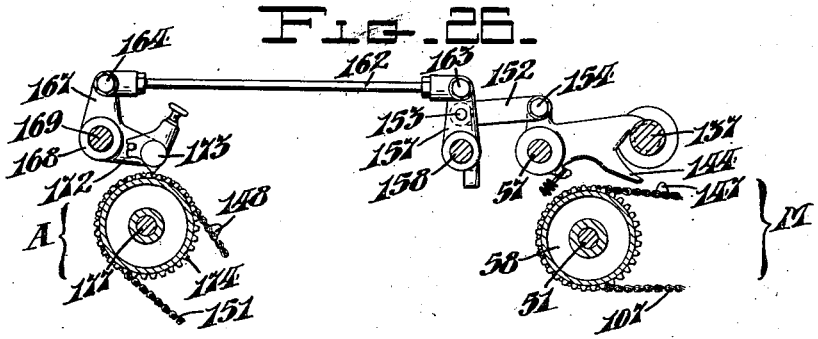
Fig. 26 is a sectional view, taken from the front of the machine, near the lower left hand portion thereof, as shown in Fig. 1, substantially along the line 26—26 of Fig. 28, of parts of the lace point control device of the invention.

To produce a lace course, without causing narrowing of the fabric, one of the buttons 148 on the chain 151 of the auxiliary pattern unit A engages the device 173 to move the crank 168 counterclockwise about the shaft 169, as viewed in Fig. 26, this action being connected through the link 162 to the lever arm 157, and through the latter, and the link 152, to the latch 144, to move the latter to release position. This action allows the stub shaft 137, under the action of the spring 143, to move the follower 138 to position between the cams 139 and 140 for shogging the cam shaft C to the right.

Upon shogging of the cam shaft, the cam 424 engages the follower 422 to actuate the lever 414, the link 408, the lever 397, the lever arm 392, the lever 388, the horizontal pin 387, the vertical pin 384 and the pawl 379, to advance the ratchet wheel 358, and the pattern chain 369 of the lace stitch attachment L to position a button 439 opposite the follower 442. The cam 587 of the lace attachment control mechanism R engages the follower 552 to subsequently actuate the lever 544, the link 539, the lever 534, the link 532, the link 524, the lever arm 517, the sleeve 453 and the face cam disk 493, to move the cam portion 494 from the neutral button 503 of the lace attachment L to the short button 504, thus causing the left shift of the slide member 462 and the lace points 446, as above described.

At the same time, each cam 334, of the narrowing lift mechanism U, engages the corresponding follower 332, to actuate the lift lever 327 and to thereby cause dipping of the front narrowing shaft 320. With this action, of shifting the cam shaft and dipping the front narrowing shaft, the cam 754 of the lace point rod displacer device D, engages the follower 752, to actuate the lever 743 and the link 739, to lower the cam bar 733 whereby the cam head 734 allows the roller 729 and the slide bar 704 to be moved to the left, as viewed in Fig. 20, by the spring 723. This action permits the slide member 462, and the parts thereon, to move to the left, as viewed in Fig. 8, thereby permitting the follower 442 to engage one of the buttons 439 on the pattern chain 369 which may be the shortest or longest button 439, to determine the group of needles to be engaged by the lace points 446, or the loops to be transferred.

When the lace points 446, carrying yarn loops, have raised to transferring position by further rotation of the dipping cam 334, the lace attachment control mechanism R is actuated, as above set forth, to transfer the loops. As the front narrowing shaft is moved to its upper position, the displacer mechanism D raises its cam head 734 against the roller 729 to move the face plate 702, and the lace bar 593 to the right. This action allows the spring 599 to move the slide member 462 to move the plunger 442 to the right, or beyond the longest of the buttons 439 on the chain 369, and the chain is given another pawling movement, as above set forth, to position another button 439 in line with the plunger 442 for the next loop transferring operation.

When the loops are to be transferred oppositely to the left transfer above set forth, or to the right, a button on the auxiliary pattern chain 151 actuates the lever 577, shown at the lower left in Fig. 1, to shift the rod 573 to the left, this action (Fig. 4) actuating the levers 567 and 558 to engage the follower 553 to the cam 589, as above set forth, whereby the lever 544 is moved counterclockwise, to actuate the link 539, the lever 534, the link 532, the link 524 and the lever 517. This action, as before stated, moves the cam portion 494 of the disk 493 into engagement with the long button 502, and moves the slide member 467 and the lace points 446, through the intermediary of the member 597 and the element 601, to the right.

To produce narrowing of the fabric, coincident with lace producing movement, or independently of this movement, as when the lace points are raised to inactive position, a button on the chain 107 of the main pattern unit M engages the follower portion 192 (Fig. 27) to move the lever 187 clockwise about the stationary shaft 57, against the action of the spring 188, which action engages the dog 194 to the lug 197 to turn the lever 198 counterclockwise about the shaft 158, against the action of the spring 201, to release the bifurcated end 228 of the lever 227 from the latch shoulder 209, thereby allowing the spring 248 (Fig. 25) to lower the follower 210 into active relation to the face cam 211. Actuation of the follower 210 by the face cam moves the link 237, and the lever 243, counterclockwise about the pin 244, as viewed in Fig. 24, thereby moving the top of the lever 254 to the left, as viewed in this figure, about the pin 257 at the rear of the machine. This movement shifts the rod 259 to the right, against the action of the spring 263, to turn the lever 272 clockwise about the pin 273, and to move the follower 278 to the left a distance of once its width toward the cam 279. With the latter normally a two cam width distance from the follower 278, when the cam shaft C is shogged to the right, the follower 278 will become aligned with the cam 279 for actuation thereby, to effect the usual narrowing action of the narrowing head B.

As indicated in Fig. 26, either the button 147 on the chain 107, or the button 148 on the chain 151, may release the latch 144, independently of the other, if they do not come up at the same time, or the button 147 may actuate the latch 144, independently of the button 148, to cause shogging of the cam shaft C for narrowing in plain fabric areas. In the latter case, the device 173 will be lifted in an idle movement.

The operation of shifting the lace points 446, and of determining the distance and direction of shift, may be better understood by a consideration of the sequence diagrams of Figs. 33 to 36, inclusive, in Fig. 33 of which the cam head 734, of the displacer device D, is in its uppermost position, with the face plate 702 holding the lace bar 593 in its farthest position to the right. In this position, the plunger 442 will clear the longest button 439 on the chain 369. At the same time, with the cam portion 494 engaging the button 503 of intermediate length, upon the descent of the cam head 734, the plunger 442, and all the elements associated therewith, including the lace point 446 would move to the left, to the position of Fig. 34, in which the plunger 442 engages the selected button 439, and the lace point 446 is opposite a certain needle 21. Note also, in this position, Fig. 34, that the screw 699 clears the face plate 702, so that the needle selection is effected entirely by the device L; the device D being merely to displace the entire assembly on the slide member 467, so that the plunger 442 will clear the longest buttons 439, as before stated.

In the position of Fig. 34 then, with the cam portion 494 on the neutral button 503, the needle opposite the points 446 may be considered the neutral needle so far as direction of shift is concerned; that is, the selection of a needle to the left of this needle will be effected by engagement of the cam portion 494 with the short button 504, as indicated in Fig. 35, and the selection of a needle to the right of the needle opposite the points 446 in Fig. 34, will be effected by engagement of the cam portion 494 with the long button 502, as indicated in Fig. 36.

From the foregoing it will be seen that the button follower 442 is displaced beyond the longest button 439 during each advancement of the pattern chain 369. Thus by means of this arrangement adjacent pattern buttons 439 may be used to position the lace points 446 at opposite extremities in the operative range of the pattern means, which range may in turn be of any desirable magnitude; whereas in prior art pattern devices such, for instance as cam disks, cam link chains, and the like, where the followers are in constant engagement therewith throughout the entire operative cycle, the range over which the loop manipulating implements can operate is definitely limited by the size of the follower member and also by the greatest degree of rise between adjacent operative positions of the pattern means which will transmit an operative movement to the follower.

It is to be understood that the expressions "modified loops" and "modified loop formations", appearing throughout this description and claims, are to be considered in a generic sense covering any special loop or stitch formations which are effected by spreading, transferring, or otherwise reshaping the customary plain knit loops or chain stitches.

Of course, the improvements specifically shown and described by which I obtain the above results, can be changed and modified in various ways without departing from the invention herein disclosed and hereinafter claimed.

I claim as my invention:

1. In a flat knitting machine, mechanism comprising point means for effecting modified loop formations, means for supporting said point means and imparting dipping movements thereto, mechanism for actuating said supporting means to effect said dipping movements, a device mounted on said supporting means for dipping movement therewith and for controlling the positioning of the point means, and additional means arranged to dip with said device for effecting loop shifting movement of said point means.

2. In a flat knitting machine, mechansm comprising point means for effecting modified loop formations, means for supporting said point means and imparting dipping movements thereto, mechanism for actuating said supporting means to effect said dipping movements, a device mounted on said supporting means for dipping movement therewith for controlling the positioning of the point means and additional means arranged to cooperate with said control means and to dip therewith for effecting loop shifting movement of said point means.

3. In a flat knitting machine, mechanism comprising point means for effecting modified loop formations, means for supporting said point means and imparting dipping movements thereto, mechanism for actuating said supporting means to effect said dipping movements, pattern means mounted on said supporting means for dipping movement therewith and for controlling the positioning of said point means, and means other than said pattern means arranged for dipping movement with said pattern means for effecting shifting movement of said point means.

4. In a flat knitting machine, mechanism comprising point means for effecting modified loop formations, means for supporting said point means and imparting dipping movements thereto, mechanism for actuating said supporting means to effect said dipping movements, pattern means mounted on said supporting means for dipping movement therewith, means also mounted on said supporting means for dipping movement therewith and cooperating with said pattern means for controlling the position of said point means, and means associated with said cooperating means to control the direction of shift of said point means.

5. In a flat knitting machine, mechanism comprising point means for effecting modified loop formations, means for supporting said point means and imparting dipping movements thereto, mechanism for actuating said supporting means to effect said dipping movements, and pattern means mounted on said supporting means for dipping movement therewith including, and providing for variation in the number and pattern controlling effect of, a plurality of separate elements in selected positions each for movement relative to said supporting means along the same path as the others for controlling the position of said point means, and means also mounted on said supporting means for dipping movement therewith, cooperating with any of said separate elements selected, and controlling the direction of shift of said point means.

6. In a flat knitting machine, mechanism comprising point means for effecting modified loop formations, means for supporting said point means and imparting dipping movements thereto, mechanism for actuating said supporting means to effect said dipping movements, and pattern means mounted on said supporting means for dipping movement therewith including, and providing for variation in number of a plurality of flexibly connected portions movable relative to said supporting means along a given path and adapted for the readily removable reception and variation in number of a plurality of separate elements in selected positions along said path for controlling the position of said point means, and means also mounted on said supporting means for dipping movement therewith, cooperating with any of said elements selected, and controlling the direction of shift of said point means.

7. In a flat knitting machine, mechanism comprising point means for effecting modified loop formations, means for supporting said point means and imparting dipping movements thereto, mechanism for actuating said supporting means to effect said dipping movements, pattern means mounted on said supporting means for dipping movement therewith and for controlling the position of said point means, and actuating means other than said pattern means mounted on said supporting means for effecting shifting movement of said point means.

8. In a flat knitting machine, mechanism comprising point means for effecting modified loop formations, means for supporting said point means and imparting dipping movements thereto, mechanism for actuating said supporting means to effect said dipping movements, and pattern means mounted on said supporting means for dipping movement therewith including, and providing for variation in the number and pattern controlling effect of, a plurality of separate elements in selected positions each for movement relative to said supporting means along the same path as the others, means also mounted on said supporting means for dipping movement therewith and cooperating with any of said separate elements selected for controlling the position of said point means, and means associated with said cooperating means to control the direction of shift of said point means.

9. In a flat knitting machine, mechanism comprising point means for effecting modified loop formations, means for supporting said point means and imparting dipping movements thereto, mechanism for actuating said supporting means to effect said dipping movements, and pattern means mounted on said supporting means for dipping movement therewith including, and providing for variation in number of a plurality of flexibly connected portions movable relative to said supporting means along a given path and adapted for the readily removable reception and variation in number of a plurality of separate elements in selected positions along said path, means also mounted on said supporting means for dipping movement therewith and cooperating with any of said elements selected for controlling the position of said point means, and means associated with said cooperating means to control the direction of shift of said point means.

10. In a flat knitting machine, mechanism comprising point means for effecting modified loop formations, means for supporting said point means and imparting dipping movements thereto, mechanism for actuating said supporting means to effect said dipping movements, pattern means including an element-receiving base mounted on said supporting means for dipping movement therewith, elements readily detachably secured to said base, means mounted on said supporting means for dipping movement therewith and cooperation with said detachable elements to control positioning of said point means, and actuating means other than said pattern means mounted on said supporting means for effecting shifting movement of said point means.

11. In a flat knitting machine, mechanism comprising point means for effecting modified loop formations, means for supporting said point means and imparting dipping movements thereto, mechanism for actuating said supporting means to effect said dipping movements, a device mounted on said supporting means for dipping movement therewith and comprising a plurality of means for controlling a plurality of operations affecting said point means, means for actuating said plurality of control means, and a number of linkage means corresponding to said plurality of control means including a linkage between each of said control means and said actuating means.

12. In a flat knitting machine, mechanism comprising point means for effecting modified loop formations, means for supporting said point means and imparting dipping movements thereto, mechanism for actuating said supporting means to effect said dipping movements, a device mounted on said supporting means for dipping movement therewith and comprising a plurality of means including means for controlling a plurality of operations affecting said point means, one of said plurality of means controlling the positioning of said point means, means for actuating said plurality of control means, and a number of linkage means corresponding to said plurality of control means including a linkage between each of said control means and said actuating means.

13. In a flat knitting machine, mechanism comprising point means for effecting modified loop formations, means for supporting said point means and imparting dipping movements thereto, mechanism for actuating said supporting means to effect said dipping movements, a device mounted on said supporting means for dipping movement therewith and comprising a plurality of means including means for controlling a plurality of operations affecting said point means, one of said plurality of means controlling the direction of shift of said point means, means for actuating said plurality of control means, and a number of linkage means corresponding to said plurality of control means including a linkage between each of said control means and said actuating means.

14. In a flat knitting machine, mechanism comprising point means for effecting modified loop formations, means for supporting said point means and imparting dipping movements thereto, mechanism for actuating said supporting means to effect said dipping movements, a device mounted on said supporting means for dipping movement therewith and comprising a plurality of means including means for controlling a plurality of operations affecting said point means, one of said plurality of means including pattern elements of different lengths, and a member cooperating with said elements to affect the point means in accordance with said lengths, means operating to move said member beyond the longest of said elements, means for actuating said plurality of control means, and a number of linkage means corresponding to said plurality of control means including a linkage between each of said control means and said actuating means.

15. In a flat knitting machine, mechanism comprising point means for effecting modified loop formations, means for supporting said point means and imparting dipping movements thereto, mechanism for actuating said supporting means to effect said dipping movements, a device mounted on said supporting means for dipping movement therewith and comprising a plurality of means including means for controlling a plurality of operations affecting said point means, one of said plurality of means controlling the positioning of said point means, and another of said plurality of means controlling the direction of shift of said point means, means for actuating said plurality of control means, and a number of linkage means corresponding to said plurality of control means including a linkage between each of said control means and said actuating means.

16. In a flat knitting machine, mechanism comprising point means for effecting modified loop formations, means for supporting said point means and imparting dipping movements thereto, mechanism for actuating said supporting means to effect said dipping movements, a device mounted on said supporting means for dipping movement therewith and comprising a plurality of means including means for controlling a plurality of operations affecting said point means, one of said plurality of means controlling the direction of shift of said point means, and another of said plurality of means including pattern elements of different lengths, and a member cooperating with said elements to control the positioning of the point means in accordance with said lengths, means operating to move said member beyond the longest of said elements, means for actuating said plurality of control means, and a number of linkage means corresponding to said plurality of control means, including a linkage between each of said control means and said actuating means.

17. In a flat knitting machine, mechanism comprising a plurality of point means for effecting separate modified loop formations, means for supporting said point means and imparting dipping movements thereto, mechanism for actuating said supporting means to effect said dipping movements, means for imparting shifting movements to said point means, and pattern means mounted on said supporting means including pattern elements movable on a given path, and means responsive to said elements for controlling the position of each of said point means and means for selecting a point means of said plurality for operation.

18. In a flat knitting machine, mechanism comprising point means for effecting modified loop formations, means for supporting said point means and imparting dipping movements thereto, mechanism for actuating said supporting means to effect said dipping movements, a device mounted on said supporting means for dipping movement therewith and comprising pattern elements of different lengths, and a member cooperating with said elements to affect the point means in accordance with said lengths, and means independent of said device operating to move said member beyond the longest of said elements.

19. In a flat knitting machine, mechanism comprising point means for effecting modified loop formations, means for supporting said point means and imparting dipping movements thereto, mechanism for actuating said supporting means to effect said dipping movements, a device mounted on said supporting means for dipping movement therewith and comprising pattern elements of different lengths, and a member cooperating with said elements to affect the point means in accordance with said lengths, and means mounted independently of said supporting means operating to move said member beyond the longest of said elements.

20. In a full fashioned knitting machine, mechanism comprising point means for effecting modified loop formations, means for supporting said point means for dipping movements, mechanism for actuating said supporting means to effect said dipping movements, means for actuating said point means to effect shifting movements thereof, pattern means mounted on said supporting means for dipping movement therewith including a plurality of pattern elements movable along separate paths, means including a member for selective cooperation with the pattern elements on said paths for controlling said point means, and eccentric means for supporting said responsive member and turning it from one to another of positions opposite said paths.

21. In a full fashioned knitting machine, a front narrowing shaft, means including a point rod and point means on the rod mounted on said shaft for effecting modified loop formations, mechanism for actuating said narrowing shaft to effect dipping movements thereof and of the point means thereon, means for actuating said point rod to effect shifting movement of the point means, pattern means mounted on said narrowing shaft for dipping movement therewith including a plurality of pattern elements of different lengths movable along a given path, means for advancing said elements step by step, means cooperating with said elements for determining the location of shift of said point means, a cam shaft, a cam on the cam shaft, and means actuated by said cam including another cam for shifting said point rod and moving said cooperating means beyond the longest of said elements between steps of said advancing means.

22. In a full fashioned knitting machine, a front narrowing shaft, point means mounted on said front narrowing shaft for effecting modified loop formations, mechanism for actuating said narrowing shaft to effect dipping movements of said point means, pattern means mounted on said narrowing shaft for determining the locations of shift of said point means, means including a plunger cooperating with said pattern means for determining the direction of shift of said point means, said direction determining means including a member operable about an axis parallel to said plunger and cam elements of different lengths, said plunger having a portion operating as a follower for said cam elements, and means for actuating said member.

23. In a full fashioned knitting machine, a front narrowing shaft, point means mounted on said front narrowing shaft for effecting modified loop formations, mechanism for actuating said narrowing shaft to effect dipping movements of said point means, pattern means mounted on said narrowing shaft including a row of pattern elements of different lengths for determining the location of shift of said point means, means including a plunger cooperating with said elements for determining the direction of shift of said point means, said direction determining means including a member operable about an axis parallel to said plunger and cam elements of different lengths, said plunger having a portion operating as a follower for said cam elements, a cam shaft, means operated by the cam shaft for actuating said member, means operated by the cam shaft for advancing said pattern means step by step, and means operated by the cam shaft for moving said plunger beyond the longest of said pattern elements between steps of said advancing means.

24. In a full fashioned knitting machine, a front narrowing shaft, point means mounted on said front narrowing shaft for effecting modified loop formations, mechanism for actuating said narrowing shaft to effect dipping movements of said point means, means for effecting shifting movements of said point means, pattern means mounted on said front narrowing shaft including a plurality of pattern elements movable along separate paths, means including a member for selective cooperation with the pattern elements on said paths for controlling said point means, eccentric means for supporting said responsive member and turning it from one to another of positions opposite the respective said paths, and cam elements of different lengths on said eccentric means for cooperation with said selective member.

25. In a full fashioned knitting machine, knitting mechanism including needles, a cam shaft, a front narrowing shaft, point means on the front narrowing shaft cooperating with the needles for effecting modified loop formations, narrowing mechanism, means for shifting the cam shaft between plain knitting and narrowing positions, cams on the cam shaft and linkages between the cams and the knitting mechanism and the point means for selectively effecting plain knitting when the cam shaft is in plain knitting position and modified loop formations when the cam shaft is in narrowing position, a pattern unit mounted on the front narrowing shaft including a pattern chain embodying parallel rows of pattern elements, the elements of each row being of different lengths, means responsive to said elements for controlling the location of shift of said point means, means for determining the direction of shift of said point means, and means for selectively operating said directing means for cooperation with any one of said element rows, means connected to said cam shaft for advancing said chain step by step, means connected to said cam shaft for actuating said directing means, means connected to the cam shaft for moving said responsive means beyond the longest of said elements between steps of said advancing means, and additional pattern means cooperating with said pattern unit for changing the operation of the machine between plain knitting, narrowing and open work operation.

GOTTLOB BITZER.